United States Patent
Pauli et al.

(10) Patent No.: US 10,837,523 B2
(45) Date of Patent: Nov. 17, 2020

(54) SPLITTER GEARBOX, OVERALL TRANSMISSION AND MOBILE AGRICULTURAL MACHINE

(71) Applicant: ZF Friedrichshafen AG, Friedrichshafen (DE)

(72) Inventors: Thomas Pauli, Tiefenbach (DE); Stefan Igl, Vilshofen (DE); Thomas Oberbuchner, Passau (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 599 days.

(21) Appl. No.: 15/565,929

(22) PCT Filed: Mar. 14, 2016

(86) PCT No.: PCT/EP2016/055421
§ 371 (c)(1),
(2) Date: Oct. 12, 2017

(87) PCT Pub. No.: WO2016/165890
PCT Pub. Date: Oct. 20, 2016

(65) Prior Publication Data
US 2018/0106331 A1    Apr. 19, 2018

(30) Foreign Application Priority Data
Apr. 16, 2015 (DE) .......... 10 2015 206 877

(51) Int. Cl.
*F16H 3/091* (2006.01)
*F16H 37/04* (2006.01)
(Continued)

(52) U.S. Cl.
CPC .......... *F16H 3/091* (2013.01); *F16H 37/042* (2013.01); *F16H 37/043* (2013.01); *F16H 2003/0826* (2013.01); *F16H 2200/0065* (2013.01)

(58) Field of Classification Search
CPC ...... F16H 3/091; F16H 37/042; F16H 37/043; F16H 2003/0826
(Continued)

(56) References Cited

U.S. PATENT DOCUMENTS 4,244,232 A * 1/1981 Murayama ............. B60K 17/28
74/15.66
6,460,425 B1 * 10/2002 Bowen .................... F16H 3/006
74/331
(Continued)

FOREIGN PATENT DOCUMENTS

DE       26 45 907 A1    4/1978
DE       102 31 838 A1   2/2004
(Continued)

OTHER PUBLICATIONS

German Search Report issued in corresponding German Patent Application No. 10 2015 206 877.3 dated Jan. 30, 2018.
(Continued)

*Primary Examiner* — Ha Dinh Ho
(74) *Attorney, Agent, or Firm* — Davis & Bujold PLLC; Michael J. Bujold (57) ABSTRACT

A splitter transmission including an input shaft, an output shaft and a countershaft. Two disk clutches, that can be coupled by a respective common clutch bell, are arranged on each of the input shaft, the output shaft and the countershaft. The clutch bells have external teeth. The disk clutches are in each case connected in a rotationally fixed manner to a loose wheel or to a fixed wheel. The input shaft is in direct
(Continued)

engagement with the output shaft and with the countershaft. The splitter transmission is characterized by the fact that the output shaft is engaged with the countershaft exclusively in an indirect manner. The splitter transmission can be combined with a group transmission and an agricultural working machine.

14 Claims, 3 Drawing Sheets

(51) Int. Cl.
*F16H 37/08* (2006.01)
*F16H 3/08* (2006.01)

(58) Field of Classification Search
USPC .................................................. 74/325, 745
See application file for complete search history.

(56) References Cited

U.S. PATENT DOCUMENTS

| | | | |
|---|---|---|---|
| 6,742,829 B2 | 6/2004 | Reihl | |
| 7,377,191 B2* | 5/2008 | Gitt | F16H 3/006 74/330 |
| 8,051,732 B2 | 11/2011 | Gitt | |
| 8,578,801 B2 | 11/2013 | Gumpoltsberger et al. | |
| 9,145,959 B2 | 9/2015 | Otten | |
| 2009/0017957 A1* | 1/2009 | Triller | F16H 37/0846 475/207 |

FOREIGN PATENT DOCUMENTS

| | | |
|---|---|---|
| DE | 10 2005 044 068 A1 | 3/2007 |
| DE | 102006011162 A1 | 11/2007 |
| DE | 10 2007 046 737 A1 | 4/2009 |
| DE | 10 2007 000 595 A1 | 5/2009 |
| DE | 10 2009 000 776 A1 | 8/2010 |
| DE | 10 2009 000 778 A1 | 8/2010 |
| DE | 10 2009 000 779 A1 | 8/2010 |
| DE | 10 2010 029 597 A1 | 12/2011 |
| DE | 10 2011 077 597 A1 | 12/2012 |
| DE | 10 2011 084 621 A1 | 4/2013 |
| DE | 10 2013 200 646 A1 | 7/2014 |
| DE | 10 2013 110 709 A1 | 4/2015 |
| EP | 0 495 942 B1 | 1/1995 |
| EP | 1 624 232 A1 | 2/2006 |

OTHER PUBLICATIONS

See German Search Report Corresponding to 10 2015 206 881.1 dated Jun. 20, 2016.
International Search Report Corresponding to PCT/EP2016/055421 dated Jun. 15, 2016.
International Search Report Corresponding to PCT/EP2016/055423 dated Jun. 15, 2016.
Written Opinion Corresponding to PCT/EP2016/055421 dated Jun. 15, 2016.
Written Opinion Corresponding to PCT/EP2016/055423 dated Jun. 15, 2016.

* cited by examiner

SPLITTER GEARBOX, OVERALL TRANSMISSION AND MOBILE AGRICULTURAL MACHINE

This application is a National Stage completion of PCT/EP2016/055421 filed Mar. 14, 2016, which claims priority from German patent application serial No. 10 2015 206 877.3 filed Apr. 16, 2015.

FIELD OF THE INVENTION

The invention relates to a splitter transmission, an overall transmission and an agricultural working machine.

BACKGROUND OF THE INVENTION

In the prior art so-termed splitter transmissions are known, which in particular are used as a functional component of an overall transmission in agricultural working machines. The splitter transmissions are transmission units which can provide a plurality of transmission ratios with only small gear intervals and during this can usually be powershifted. Usually, in an agricultural working machine a splitter transmission of that type is in driving connection in series with a so-termed synchromesh transmission. A synchromesh transmission is also a multi-gear transmission unit which constitutes a further functional component of the overall transmission of an agricultural working machine. However, the synchromesh transmission has comparatively large gear intervals and cannot be powershifted. By virtue of the combination of the splitter transmission and the synchromesh transmission an overall transmission is produced, with which a large number of gears can be obtained and at the same time the spread is large, while ensuring a plurality of powershiftable ranges. Thus, such overall transmissions allow a largely optimal use of the engine traction force for the work or the driving speeds required in each case, for example field cultivation work and transport activities.

In this connection DE 26 45 907 describes a multi-stage transmission. The multi-stage transmission consists of a splitter transmission in the form of a fine-stepped input group whose fixed wheels are arranged in sequence on an input shaft powered directly by the main drive unit and whose shifting clutches and loose wheels are all arranged in sequence next to one another on a first countershaft. Furthermore, the multi-stage transmission consists of a main group in driving connection downstream from the input group, with a drive input shaft arranged axially as an extension of the first countershaft and a drive output shaft that can be driven by the input group by way of shifting clutches and loose wheels and fixed wheels that mesh with the latter. Arranged spatially between the input group and the main group intermediate gearing is provided, which contains both a gearset for a crawling gear and a gearset for reversing gears, the shifting elements of which are arranged one after another on the first transmission shaft that carries shifting clutches of the input group.

From EP 0495942 B1 a multi-stage transmission of planetary design is known, which as the splitter group of an agricultural working machine is combined with a group transmission. In this case the splitter transmission has a housing in which four planetary gearsets and a plurality of shafts are arranged, of which one is the drive input shaft and another is the drive output shaft of the multi-stage transmission. In addition, in the area of the shafts, a number of shifting elements are provided, by the selective actuation of which the power flow within the four planetary gearsets is varied, so that various transmission ratios between the drive input shaft and the drive output shaft can be obtained. In total, eight transmission ratios of the multi-stage transmission can be obtained thereby.

DE 10 2009 000 778 A1 discloses a toothed-wheel gearshift transmission comprising an input group that serves as a splitter group, a main group and optionally an intermediate gearset connected between the splitter group and the main group, wherein the input group comprises an input shaft, a first countershaft arranged parallel to the input shaft and forming the drive output of the input group, and a second countershaft also arranged parallel to the input shaft which serves as a reversing shaft for driving in reverse, and wherein on the input shaft and on both the countershafts in each case a powershiftable dual disk clutch is arranged. In this case the clutch bells of the dual clutches engage directly or indirectly with one another by way of external teeth.

Figure 1A:
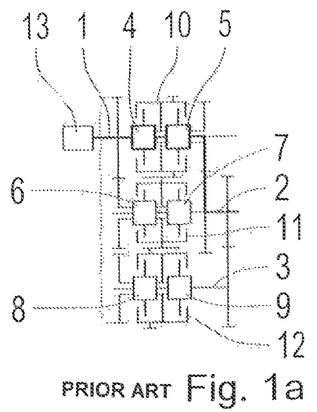
FIGS. 1a-1i: Schematic representations of a known splitter transmission.
Figure 1B:
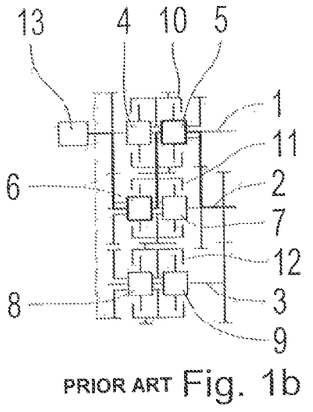
Figure 1C:
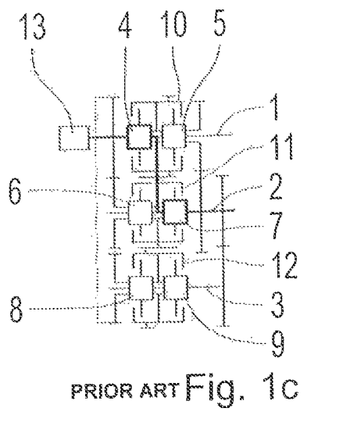
Figure 1D:
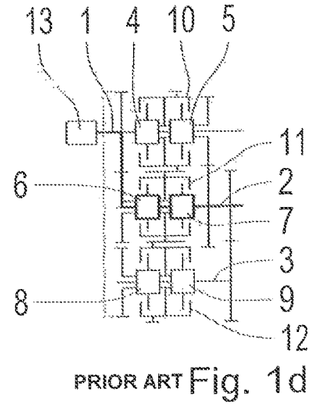
Figure 1E:
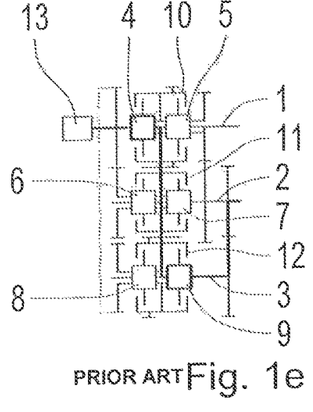
Figure 1F:
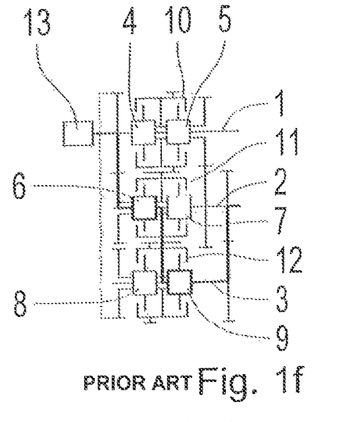
Figure 1G:
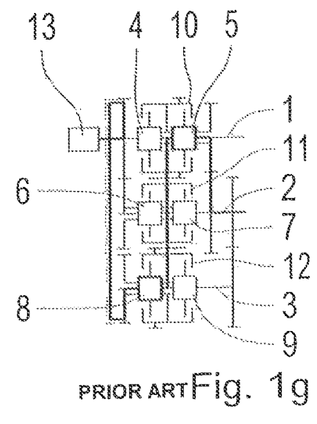
Figure 1H:
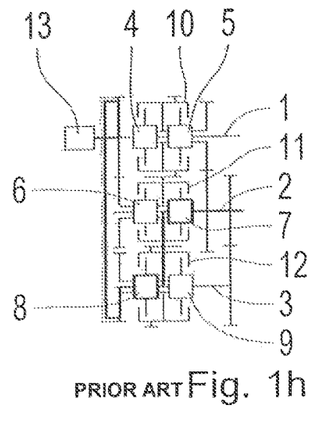
Figure 1I:
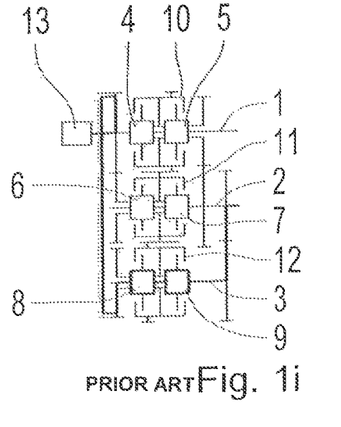

FIGS. 1a-1i relates to a splitter transmission of the applicant, which consists of three axis-parallel shafts 1, 2 and 3 and six powershiftable disk clutches 4, 5, 6, 7, 8 and 9. The shaft 1 is the input shaft 1, whereas the shaft 2 is the output shaft 2. The shaft 3 serves as a countershaft 3. Each of the three shafts 1, 2, 3 is directly engaged with the respective other shafts, the engagement of shaft 1 with shaft 3 being indicated by a dotted line since this cannot be shown in any other way in the two-dimensional views of FIGS. 1a-1i. The disk clutches 4 and 5 or 6 and 7 or 8 and 9, respectively, can in each case be coupled by way of common clutch bells 10, 11 and 12. Furthermore, the clutch bells 10, 11 and 12 are in direct engagement with one another. On the drive input side, the input shaft 1 is driven by a drive aggregate 13 and on the drive output side the output shaft 2 is in driving connection with a main clutch (not shown). In FIG. 1a, a first forward gear is engaged, for which the clutches 4 and 5 are closed and the clutches 6, 7, 8 and 9 are open. FIG. 1b shows a second engaged forward gear, for which the clutches 6 and 7 are closed while the clutches 4, 5, 8 and 9 are open. Likewise, FIGS. 1c to 1f show further engaged forward gears with the associated clutch actuations indicated in each case. On the other hand FIGS. 1g to 1i show three different engaged reverse gears, for each of which the clutch 8 is closed. For that reason the clutch 8 is also called the reversing clutch. Thus, in total the splitter transmission shown in FIGS. 1a-1i has six powershiftable forward gears and three powershiftable reverse gears.

However, the known overall transmissions or splitter transmissions have the disadvantage that as a rule they can only provide up to six powershiftable gears, i.e. the splitter transmissions are in the best case designed as so-termed sixfold splitter transmissions. Often, even so-termed fourfold splitter transmissions are used, which have only four powershiftable gears. These splitter transmissions are combined with the synchromesh transmissions, which for their part have four to six synchromesh gears depending on the design of the splitter transmission. However, the more non-powershiftable gears an overall transmission has, the more often does the load flow have to be interrupted during shifting. Particularly with agricultural working machines this results during fieldwork in undesirably sharp braking, after which the speed lost in that way then has to be picked up again in a less favorable gear. During heavy fieldwork such as plowing operations it is even completely impossible to engage a synchromesh gear so that the agricultural working machine has to be operated at an undesirably slow working rate, which in turn has a negative impact on productivity.

SUMMARY OF THE INVENTION

A purpose of the present invention is to propose an improved splitter transmission.

According to the invention this objective is achieved by the splitter transmission according to the independent claim. Advantageous design features and further developments of the invention emerge from the dependent claims.

The invention concerns a splitter transmission comprising an input shaft, an output shaft and a countershaft, wherein on the input shaft, the output shaft and the countershaft in each case two disk clutches that can be coupled by a respective common clutch bell are arranged, wherein the clutch bells have external teeth, wherein the disk clutches are in each case connected in a rotationally fixed manner to a loose wheel or to a fixed wheel, and wherein the input shaft is directly engaged with the output shaft and the countershaft. The splitter transmission according to the invention is distinguished by the fact that the output shaft is exclusively indirectly engaged with the countershaft.

This has the advantage that instead of the six powershiftable forward gears that can usually be obtained with this type of splitter transmission design, a total of nine powershiftable forward gears can be obtained. On the other hand, however, the usually available three powershiftable reverse gears are absent. Thus, the splitter transmission according to the invention offers for each of the existing synchromesh gears a comparatively larger and therefore more flexible powershift range in the forward direction. This enables better utilization of the traction force of the engine for various working requirements. On the other hand the absence of the powershiftable reverse gears has no, or hardly any adverse effects, since by means of a reversing gearset that can optionally be provided the rotational direction can be reversed so that, correspondingly, nine powershiftable gears for reverse driving are available.

The indirect engagement of the output shaft with the countershaft preferably takes place by way of the input shaft. Since the input shaft is in any case directly engaged with the output shaft and the countershaft, it is advantageously not necessary to provide additional shafts or gearwheels.

The splitter transmission according to the invention is preferably of countershaft design.

According to a preferred embodiment of the invention it is provided that the disk clutches are connected rotationally fixed to the loose wheel or to the fixed wheel concerned by way of their inner disk carriers. In combination with a clutch bell, inner disk carriers provide a space-saving, load-bearing and low-maintenance option for the coupling of various transmission elements.

In a further preferred embodiment of the invention it is provided that on a first side of the input shaft there is arranged a first fixed wheel of the input shaft, which meshes with a first loose wheel of the countershaft arranged on a first side of the countershaft and/or with a first loose wheel of the output shaft arranged on a first side of the output shaft, and on a second side of the input shaft there is arranged a first loose wheel of the input shaft, which meshes with a first fixed wheel of the countershaft arranged on a second side of the countershaft and/or with a first fixed wheel of the output shaft arranged on a second side of the output shaft. This type of arrangement or engagement of the individual loose and fixed wheels has been found to be particularly suitable in relation to the functionality, the assembly and also the reliability of the splitter transmission according to the invention.

Since the splitter transmission according to the invention can be used exceedingly flexibly, there is no need to denote the "first side" or the "second side" in a fixed manner as the drive input side or the drive output side. Rather, both of these associations are possible and may be selected flexibly by a person with knowledge of the field in accordance with the problem involved.

According to a further preferred embodiment of the invention it is provided that arranged adjacent to the first fixed wheel of the input shaft there is a second fixed wheel of the input shaft, in such manner that the first fixed wheel of the input shaft meshes with the first loose wheel of the countershaft whereas the second fixed wheel of the input shaft meshes with the first loose wheel of the output shaft, and/or adjacent to the first loose wheel of the input shaft there is arranged a second loose wheel of the input shaft, in such manner that the first loose wheel of the input shaft meshes with the first fixed wheel of the output shaft and the second loose wheel of the input shaft meshes with the first fixed wheel of the countershaft. This is also an embodiment that offers comparatively great flexibility for the design of a plurality of different transmission ratios of the splitter transmission.

In a particularly preferred embodiment of the invention it is provided that the first and second fixed wheels of the input shaft have different pitch circle diameters and/or the first and second loose wheels of the input shaft have different pitch circle diameters. This favors the provision of a further or more flexibly specified spread of the various transmission ratios by the splitter transmission according to the invention.

According to a further preferred embodiment of the invention it is provided that the input shaft, the output shaft and the countershaft are arranged in the splitter transmission with their axes parallel. This simplifies the realization of the meshing interactions of the various loose and fixed wheels with one another.

In another preferred embodiment of the invention it is provided that as viewed axially from above, the input shaft, the output shaft and the countershaft are arranged in one plane in the splitter transmission. This enables the splitter transmission to be configured in a comparatively flat form and can have advantages depending on the intended use.

According to an alternative preferred embodiment of the invention it is provided that as viewed axially, the input shaft, the output shaft and the countershaft are arranged in the form of a triangle in the splitter transmission. This enables a comparatively compact structure of the splitter transmission and can also have advantages, depending on the intended use.

In a further preferred embodiment of the invention it is provided that by means of defined actuations of the disk clutches, the input shaft and the output shaft can be coupled with one another directly or indirectly to produce defined transmission ratios, wherein for each actuation exclusively one disk clutch on the drive input side and exclusively one disk clutch on the drive output side are closed, so that nine powershiftable forward gears can be obtained. Thus, in a simply designed manner various defined transmission ratios between the input rotational speed and the output rotational speed can be obtained. Since in each case one disk clutch on the drive input side and one disk clutch on the drive output side are closed, and the transmission comprises a total of three shafts each with two disk clutches, i.e. three on the drive input side and three on the drive output side, a total of nine powershiftable forward gears can thus be obtained. The remaining four disk clutches are preferably each open.

According to a further preferred embodiment of the invention it is provided that on the drive input side, the input shaft can be brought into driving connection with a drive aggregate and/or the output shaft constitutes a drive output of the splitter transmission. In this way the initial rotational speed and the initial torque of the drive aggregate can be transformed and passed on as necessary, which in a vehicle for example enables a largely optimum use of the engine traction force generated. The driving connection can be direct or indirect.

In another preferred embodiment of the invention it is provided that on the drive output side, the output shaft can be brought into driving connection with a main clutch. In this way the rotational speed and the torque transformed by the splitter transmission can be passed on by way of the main clutch, for example to a further transmission unit. Moreover, the main clutch enables for example the driving connection between the drive aggregate and any transmission units that come after the splitter transmission, or the driven wheels of a vehicle having the splitter transmission, to be separated.

The invention also relates to an overall transmission for an agricultural working machine, which comprises a splitter transmission and a synchromesh transmission and/or a reversing gearset and/or a crawling-gear gearset. The overall transmission according to the invention is characterized in that the splitter transmission is a splitter transmission according to the invention. The use of the splitter transmission according to the invention as one of a number of transmission units in an overall transmission results in the advantages already described in connection with the splitter transmission according to the invention.

Furthermore, the invention relates to an agricultural working machine having an overall transmission according to the invention. Thus, the advantages described in connection with the overall transmission according to the invention or the splitter transmission according to the invention also apply to the agricultural working machine according to the invention.

BRIEF DESCRIPTION OF THE DRAWINGS

Below, the invention is explained with reference to the example embodiments illustrated in the figures, which show.

DETAILED DESCRIPTION OF THE PREFERRED EMBODIMENTS

The same objects, functional units and comparable components are denoted by the same indexes in all the figures. These objects, functional units and comparable components are designed identically as regards their technical features unless indicated explicitly or implicitly in the description.

Figure 2:
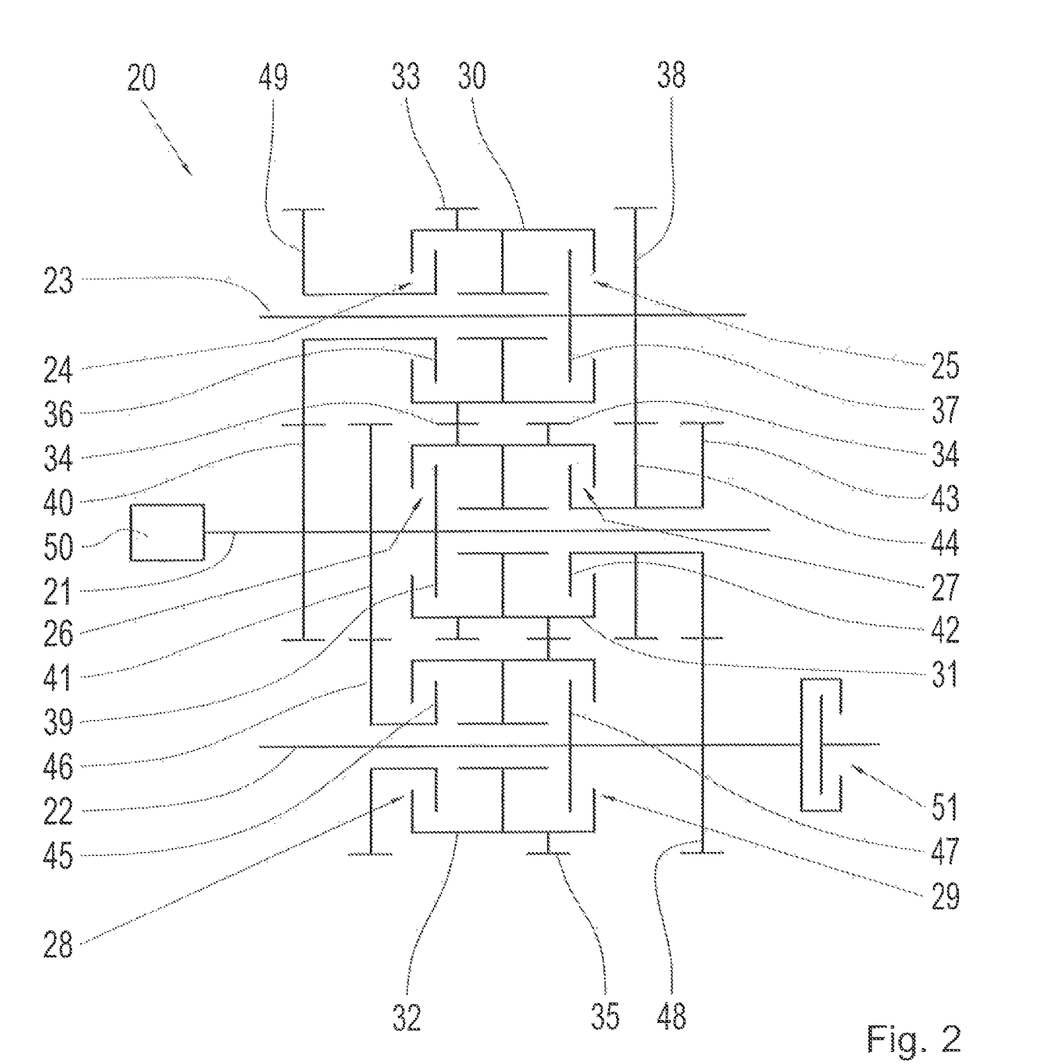
FIG. 2: A schematic representation of a possible first embodiment of a splitter transmission according to the invention.

FIG. 2 shows schematically a possible first embodiment of a splitter transmission 20 according to the invention. In this example the splitter transmission 20 according to the invention comprises an input shaft 21, an output shaft 22 and a countershaft 23, which are arranged in the splitter transmission 20 with their axes parallel. On the input shaft 21, the output shaft 22 and the countershaft 23 there are arranged in each case two disk clutches 24 and 25, 26 and 27, and 28 and 29 respectively, which can be coupled by means of respective clutch bells 30, 31 and 32. On the drive input side, the input shaft 21 is in driving connection with a drive aggregate 50, in this example an internal combustion engine, while on the drive output side the output shaft 22 is in driving connection with a main clutch 51.

By means of external teeth 33, the clutch bell 30 engages directly with external teeth 34 of the clutch bell 31. In turn, the clutch bell 31 has external teeth 34 which engage directly with the external teeth 35 of the clutch bell 32. Thus, the clutch bell 30 is in indirect engagement with the clutch bell 32. As can also be seen, by way of an inner disk carrier 36, the disk clutch 24 is in rotationally fixed connection with a first loose wheel 49 of the countershaft 23. Likewise, by way of an inner disk carrier 37, the disk clutch 25 is connected rotationally fixed to a first fixed wheel 38 of the countershaft 23. Furthermore, by way of an inner disk carrier 39, the disk clutch 26 is connected rotationally fixed to a first fixed wheel 40 and a second fixed wheel 41 of the input shaft 21. In this case the second fixed wheel 41 of the input shaft 21 is adjacent to the first fixed wheel 40 of the input shaft 21. By way of an inner disk carrier 42, the disk clutch 27 is connected rotationally fixed to a first loose wheel 43 and a second loose wheel 44 of the input shaft 21, and the second loose wheel 44 of the input shaft 21 is adjacent to the first loose wheel 43 of the input shaft 21. By way of an inner disk carrier 45, the disk clutch 28 is connected rotationally fixed to a first loose wheel 46 of the output shaft 22, whereas by way of an inner disk carrier 47, the disk clutch 29 is connected rotationally fixed to a first fixed wheel 48 of the output shaft 22.

As can also be seen from FIG. 2, the first fixed wheel 40 of the input shaft 21 meshes with the first loose wheel 49 of the countershaft 23 and the second fixed wheel 41 of the input shaft 21 meshes with the first loose wheel 46 of the output shaft 22. At the same time, the first loose wheel 43 of the input shaft 21 meshes with the first fixed wheel 48 of the output shaft 22 and the second loose wheel 44 of the input shaft 21 meshes with the first fixed wheel 38 of the countershaft 23.

Thus, by way of the meshing engagements the input shaft 21 is directly engaged with the output shaft 22 and with the countershaft 23. However, the output shaft 22 is exclusively engaged with the countershaft 23 indirectly, by way of the input shaft 21.

Although this cannot be seen from the schematic representation shown in FIG. 2, in this example the first fixed wheel 40 of the input shaft 21 and the second fixed wheel 41 of the input shaft 21 have different pitch circle diameters. Likewise, the first loose wheel 43 of the input shaft 21 and the second loose wheel 44 of the input shaft 21 have different pitch circle diameters. This enables the spread of the splitter transmission 20 shown as an example to be determined extremely flexibly.

By means of defined actuations of the disk clutches 24, 25, 26, 27, 28, 29 the input shaft 21 and the output shaft 22 can be coupled with one another directly or indirectly with various transmission ratios. In each such actuation, exclusively one disk clutch 24, 26, 28 on the drive input side and exclusively one disk clutch 25, 27, 29 on the drive output side are closed. The remaining disk clutches 24, 25, 26, 27, 28, 29 are open in each case. In this way nine powershiftable forward gears are obtained, whose transmission ratios are as shown in the table below (the transmission ratio in each case is obtained computationally from the pitch circle diameters of the loose or fixed wheels or external teeth indicated in the column headed "Transmission ratio", wherein for the sake of clarity the pitch circle diameters of the loose or fixed wheels or external teeth are denoted only by the indexes of the loose or fixed wheels or external teeth):

| Powershiftable gear | Disk clutches closed | Transmission ratio |
|---|---|---|
| 1 | 24 and 25 | $\frac{49 \cdot 44 \cdot 48}{40 \cdot 38 \cdot 43}$ |
| 2 | 24 and 27 | $\frac{49 \cdot 34 \cdot 48}{40 \cdot 30 \cdot 43}$ |
| 3 | 24 and 29 | $\frac{49 \cdot 34 \cdot 32}{40 \cdot 30 \cdot 34}$ |
| 4 | 26 and 25 | $\frac{33 \cdot 44 \cdot 48}{34 \cdot 38 \cdot 43}$ |
| 5 | 26 and 27 | $\frac{48}{43}$ |
| 6 | 26 and 29 | $\frac{35}{34}$ |
| 7 | 28 and 25 | $\frac{46 \cdot 34 \cdot 33 \cdot 44 \cdot 48}{41 \cdot 35 \cdot 34 \cdot 38 \cdot 43}$ |
| 8 | 28 and 27 | $\frac{46 \cdot 34 \cdot 48}{41 \cdot 35 \cdot 43}$ |
| 9 | 28 and 29 | $\frac{46}{41}$ |

FIGS. 3a-3e show a schematic representation of an axial plan view, of a series of different arrangement options of the input shaft 21, the output shaft 22 and the countershaft 23 in a splitter transmission 20 according to the invention. In each case the dotted lines indicate meshing interactions. The dotted lines cancelled by a cross mean that the shafts connected by those lines are not in engagement with one another.

Figure 3A:
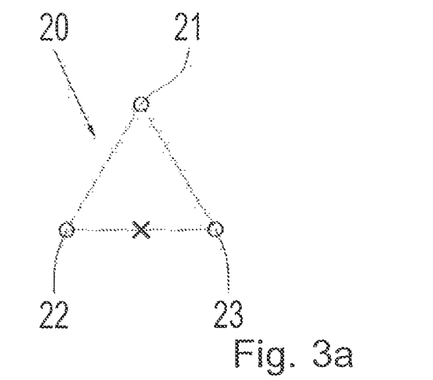
FIGS. 3a-3e: Schematic illustrations of an axial plan view of a series of different possible arrangements of the input shaft, the output shaft and the countershaft in a splitter transmission according to the invention.

FIG. 3a shows the input shaft 21, the output shaft 22 and the countershaft 23 in an axial arrangement corresponding to an equilateral triangle. The input shaft 21 is in direct engagement with the output shaft 22 and with the countershaft 23. On the other hand, the output shaft 22 and the countershaft 23 are not in direct engagement.

Figure 3B:
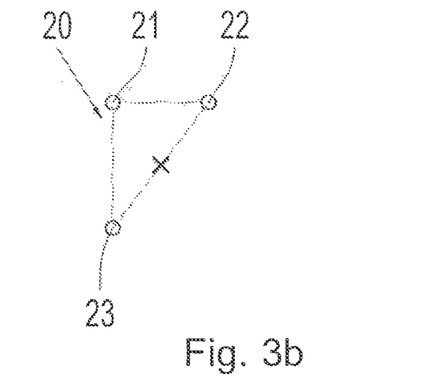

FIG. 3b shows the input shaft 21, the output shaft 22 and the countershaft 23 in an axial arrangement corresponding to a right-angled triangle. As can be seen, the input shaft 21 is in direct engagement with the output shaft 22 and with the countershaft 23. The output shaft 22 and the countershaft 23 are not in direct engagement.

Figure 3C:
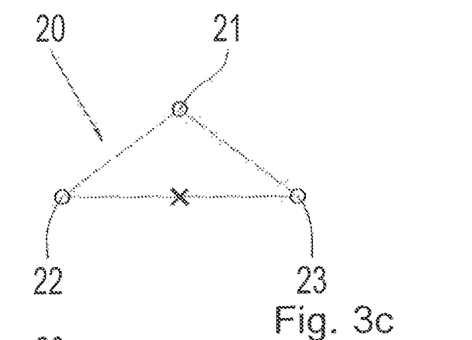

FIG. 3c shows the input shaft 21, the output shaft 22 and the countershaft 23 in an axial arrangement corresponding to an isosceles triangle. As can be seen, in this case too the input shaft 21 is directly engaged with the output shaft 22 and with the countershaft 23. On the other hand, the output shaft 22 and the countershaft 23 are not in direct engagement.

Figure 3D:
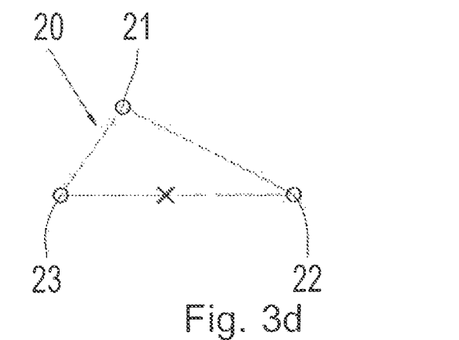

FIG. 3d shows the input shaft 21, the output shaft 22 and the countershaft 23 in an axial arrangement which corresponds to a triangle in general. As can also be seen here, the input shaft 21 is again directly engaged with the output shaft 22 and with the countershaft 23. Again, however, the output shaft 22 and the countershaft 23 are not directly engaged.

Figure 3E:
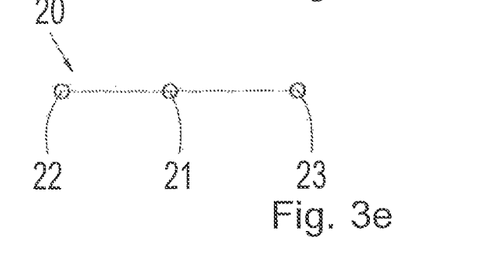

FIG. 3e shows the input shaft 21, the output shaft 22 and the countershaft 23 in a planar axial arrangement. In this case too the input shaft 21 is directly engaged with the output shaft 22 and with the countershaft 23. However, the output shaft 22 and the countershaft 23 are again not in direct engagement.

Figure 4:
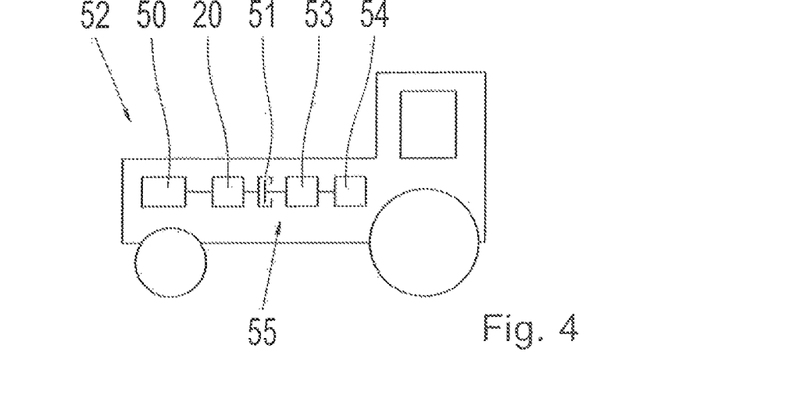
FIG. 4: A schematic representation of an agricultural working machine with an overall transmission according to the invention.

FIG. 4 shows schematically an agricultural working machine 52 with an overall transmission 55 according to the invention. In this example the overall transmission 55 comprises the splitter transmission 20 according to the invention, a synchromesh transmission 53 and a reversing gearset 54. The reversing gearset 54 is in driving connection by way of a drive output (not shown) with the wheels of the agricultural working machines 52. As can also be seen, the splitter transmission 20 is in driving connection by way of the main clutch 51 with the synchromesh transmission 53. In this example the drive aggregate is an internal combustion engine 50, which in turn is in driving connection with the input shaft of the splitter transmission 20.

INDEXES

1 Input shaft
2 Output shaft
3 Countershaft
4 Disk clutch
5 Disk clutch
6 Disk clutch
7 Disk clutch
8 Disk clutch
9 Disk clutch
10 Clutch bell
11 Clutch bell
12 Clutch bell
13 Drive aggregate
20 Splitter transmission
21 Input shaft
22 Output shaft
23 Countershaft
24 Disk clutch
25 Disk clutch
26 Disk clutch
27 Disk clutch
28 Disk clutch
29 Disk clutch
30 Clutch bell
31 Clutch bell
32 Clutch bell
33 External teeth
34 External teeth
35 External teeth
36 Inner disk carrier
37 Inner disk carrier
38 First fixed wheel of the countershaft
39 Inner disk carrier
40 First fixed wheel of the input shaft
41 Second fixed wheel of the input shaft
42 Inner disk carrier
43 First loose wheel of the input shaft
44 Second loose wheel of the input shaft
45 Inner disk carrier
46 First loose wheel of the output shaft
47 Inner disk carrier
48 First fixed wheel of the output shaft 49 First loose wheel of the countershaft
50 Drive aggregate
51 Main clutch
52 Agricultural working machine
53 Synchromesh transmission
54 Reversing gearset
55 Overall transmission

The invention claimed is:

1. A splitter transmission comprising:
an input shaft
an output shaft,
a countershaft,
two disk clutches,that are couplable by a respective common clutch bell, being arranged on each of the input shaft, the output shaft and the countershaft,
the clutch bells having external teeth,
the disk clutches, in each case, being connected in a rotationally fixed manner either to a loose wheel or to a fixed wheel, and
the input shaft being in direct engagement with the output shaft and with the countershaft, and the output shaft being exclusively indirectly engaged with the countershaft.

2. The splitter transmission according to claim 1, wherein the disk clutches are connected in a rotationally fixed manner either to the loose wheel or to the fixed wheel concerned by inner disk carriers.

3. The splitter transmission according to claim 1, wherein a first fixed wheel of the input shaft, which meshes with at least one of a first loose wheel of the countershaft arranged on a first side of the countershaft and a first loose wheel of the output shaft arranged on a first side of the output shaft, are arranged on a first side of the input shaft, and
a first loose wheel of the input shaft, which meshes with at least one of a first fixed wheel of the countershaft arranged on a second side of the countershaft and a first fixed wheel of the output shaft arranged on a second side of the output shaft are arranged on a second side of the input shaft.

4. The splitter transmission according to claim 1, wherein a second fixed wheel of the input shaft is arranged adjacent to a first fixed wheel of the input shaft,
the first fixed wheel of the input shaft meshes with a first loose wheel of the countershaft while the second fixed wheel of the input shaft meshes with a first loose wheel of the output shaft, and/or
a first loose wheel of the input shaft is arranged adjacent to a second loose wheel of the input shaft such that the first loose wheel of the input shaft meshes with a first fixed wheel of the countershaft and the second loose wheel of the input shaft meshes with a first fixed wheel of the output shaft.

5. The splitter transmission according to claim 1, wherein a first fixed wheel of the input shaft is arranged adjacent to a second fixed wheel of the input shaft, and the first fixed wheel of the input shaft meshes with a first loose wheel of the output shaft, and/or
the second fixed wheel of the input shaft meshes with a first loose wheel of the countershaft, and adjacent to a first loose wheel of the input shaft a second loose wheel of the input shaft is arranged such that the first loose wheel of the input shaft meshes with a first fixed wheel of the output shaft and the second loose wheel of the input shaft meshes with a first fixed wheel of the countershaft.

6. The splitter transmission according to claim 4, wherein at least one of:
the first and the second fixed wheels of the input shaft have different pitch circle diameters, and
the first and the second loose wheels of the input shaft have different pitch circle diameters.

7. The splitter transmission according to claim 1, wherein the input shaft, the output shaft and the countershaft are arranged in the splitter transmission such that axes thereof are parallel to one another.

8. The sputter transmission according to claim 1, wherein, when viewed axially from above, the input shaft, the output shaft and the countershaft are arranged in the spatter transmission in one plane.

9. The sputter transmission according to claim 1, wherein, when viewed axially, the input shaft, the output shaft and the countershaft are arranged in the splitter transmission in a form of a triangle.

10. The splitter transmission according to claim 1, wherein the input shaft and the output shaft are couplable either directly or indirectly, with one another to obtain defined transmission ratios by defined actuations of the disk clutches, and, for each such actuation exclusively one disk clutch, on a drive input side, and exclusively one disk clutch, on a drive output side, are engage so that nine powershiftable forward gears are obtained.

11. The splitter transmission according to claim 1, wherein at least one of:
the input shaft is drivingly connectable with a drive aggregate on a drive input side, and
the output shaft is a drive output of the splitter transmission.

12. The splitter transmission according to claim 1, wherein the output shaft can be brought into driving connection with a main clutch on the drive output side.

13. An overall transmission for an agricultural working machine comprising:
a splitter transmission,
at least one of a synchromesh transmission,
a reversing gearset, and
a crawling-gear gearset,
the splitter transmission comprising:
an input shaft,
an output shaft,
a countershaft,
two disk clutches, that are couplable by a respective common clutch bell being arranged on each of the input shaft, the output shaft and the countershaft,
the clutch bells having external teeth,
the disk clutches, in each case, being connected in a rotationally fixed manner either to a loose wheel or to a fixed wheel, and
the input shaft being in direct engagement with the output shaft and with the countershaft, and the output shaft being exclusively indirectly engaged with the countershaft.

14. An agricultural working machine comprising:
an overall transmission comprising:
a splitter transmission,
at least one of a synchromesh transmission,
a reversing gearset, and
a crawling-gear gearset,
the splitter transmission comprising:
an input shaft,
an output shaft,
a countershaft,
two disk clutches, that are couplable by a respective common clutch bell, being arranged on each of the input shaft, the output shaft and the countershaft, the clutch bells having external teeth, the disk clutches, in each case, being connected in a rotationally fixed manner either to a loose wheel or to a fixed wheel, and the input shaft being in direct engagement with the output shaft and with the countershaft, and the output shaft being exclusively indirectly engaged with the countershaft.

\* \* \* \* \*